(12) United States Patent
Ueura (10) Patent No.: US 11,440,518 B2
(45) Date of Patent: Sep. 13, 2022

(54) VEHICLE BRAKING SYSTEM

(71) Applicant: HONDA MOTOR CO., LTD., Tokyo (JP)

(72) Inventor: Soichiro Ueura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 533 days.

(21) Appl. No.: 16/534,203

(22) Filed: Aug. 7, 2019

(65) Prior Publication Data

US 2020/0047729 A1 Feb. 13, 2020

(30) Foreign Application Priority Data

Aug. 8, 2018 (JP) .............................. JP2018-149066

(51) Int. Cl.
*B60T 8/40* (2006.01)
*B60T 8/173* (2006.01)
(Continued)

(52) U.S. Cl.
CPC .............. *B60T 8/245* (2013.01); *B60T 8/185* (2013.01); *B60W 30/18118* (2013.01);
(Continued)

(58) Field of Classification Search
CPC ...... B60T 8/245; B60T 8/185; B60T 2201/06; B60T 2270/404; B60T 2270/88; B60T 7/042; B60T 13/146; B60T 13/662; B60T 13/686; B60T 13/745; B60T 8/4081; B60T 8/173; B60T 2270/40; B60T 11/16; B60W 30/18118; B60W 30/18054; G60T 8/17; G60T 2201/06
See application file for complete search history.

(56) References Cited

U.S. PATENT DOCUMENTS 8,746,813 B2 * 6/2014 Matsushita ......... B60W 10/184
303/152
8,897,984 B2 * 11/2014 Ito ........................ B60T 13/142
701/70
(Continued)

FOREIGN PATENT DOCUMENTS

JP 2008143419 A * 6/2008 .............. B60T 11/20
JP 2016-179787 A 10/2016
JP 6151287 B2 * 6/2017

*Primary Examiner* — Redhwan K Mawari
*Assistant Examiner* — Kathleen B Ward
(74) *Attorney, Agent, or Firm* — Rankin, Hill & Clark LLP (57) ABSTRACT

A vehicle braking system includes: a master cylinder; a slave cylinder communicated with the master cylinder; a vehicle behavior stabilizer communicated with the slave cylinder; first and second master cut valves, each being a normally closed valve for opening and closing a fluid flow path between the master cylinder and the slave cylinder, for making hydraulic pressures in the slave cylinder and the vehicle behavior stabilizer work in a valve closing direction; a pressure sensor for detecting the hydraulic pressure in the vehicle behavior stabilizer; and a piston controller for advancing first and second slave pistons in the slave cylinder when the hydraulic pressure on the vehicle behavior stabilizer side, detected by the pressure sensor, exceeds a predetermined value, and returning the pistons at a predetermined timing.

9 Claims, 5 Drawing Sheets

(51) Int. Cl.
*B60T 8/24* (2006.01)
*B60T 8/18* (2006.01)
*B60W 30/18* (2012.01)

(52) U.S. Cl.
CPC ..... *B60T 2201/06* (2013.01); *B60T 2270/404* (2013.01); *B60T 2270/88* (2013.01)

(56) References Cited

U.S. PATENT DOCUMENTS

| | | | |
|---|---|---|---|
| 9,067,577 B2* | 6/2015 | Ito | B60T 8/1755 |
| 9,434,365 B2* | 9/2016 | Kinoshita | B60T 7/042 |
| 9,452,741 B2* | 9/2016 | Kidera | B60T 13/686 |
| 9,499,149 B2* | 11/2016 | Kobayashi | B60T 13/683 |
| 2006/0111823 A1* | 5/2006 | Tamai | B60W 10/06 |
| | | | 701/38 |
| 2016/0236661 A1* | 8/2016 | Aoki | B60T 13/686 |

* cited by examiner

VEHICLE BRAKING SYSTEM

CROSS-REFERENCE TO RELATED APPLICATION

This application is based upon and claims priority from the Japanese Patent Application No. 2018-149066, filed on Aug. 8, 2018, the entire contents of which are incorporated herein by reference.

BACKGROUND OF THE INVENTION

1. Field of the Invention

The present invention relates to a vehicle braking system.

2. Description of the Related Art

For example, a technique disclosed in Japanese Unexamined Patent Application Publication No. 2016-179787 (Patent document 1) relates to a vehicle braking system including a brake-by-wire system and a hydraulic pressure control unit. That is, according to the technique, the hydraulic pressure control unit holds a hydraulic pressure to perform hill hold control. This involves a risk that a self-lock phenomenon may occur in which the hydraulic pressures in the slave cylinder and the hydraulic pressure control unit become excessively high to make the master cut valves unable to open.

As a measure against the self-lock phenomenon, the technique disclosed in Patent document 1 allows the pistons inside the slave cylinder to advance slightly in a pressurizing direction while the hydraulic pressure control unit is holding the hydraulic pressure. Thereafter, when the driver takes the foot off the brake pedal, or when the hill hold control is terminated, the pistons are withdrawn to be returned to their initial positions inside the slave cylinder. This action of returning the pistons enables the brake fluid to be collected into the pistons to some extent. This makes it possible to inhibit excessive increases in the hydraulic pressures in the slave cylinder and the hydraulic pressure control unit, and to open the master cut valves.

The technique disclosed in Patent document 1, however, causes operation noise when operating the pistons in the slave cylinder for preventing the self-lock phenomenon of the master cut valves. Moreover, even during their driving, vehicles of recent years stop their engines more frequently while performing an idling stop function, or an EV mode and the like in a case where they are hybrid vehicles. While the engines are stopped, the operation noise caused by the pistons working in the slave cylinder is more audible, and occupants of the vehicles are more likely to feel uncomfortable from the operation noise.

The present invention has therefore been made in view of the above problems, and an object of the invention is to provide a vehicle braking system capable of inhibiting occurrence of operation noise caused by a piston in a slave cylinder to reduce possibility that an occupant of the vehicle may feel uncomfortable from the operation noise.

SUMMARY OF THE INVENTION

In order to attain the above object, according to an aspect of the present invention, a vehicle braking system reflecting one aspect of the present invention includes: a master cylinder for generating a hydraulic pressure in response to a pedal effort of a driver; a slave cylinder communicated with the master cylinder, for generating a braking force for a vehicle using a hydraulic pressure by operating an electric actuator to drive a piston; a vehicle behavior stabilizer communicated with the slave cylinder, for generating a braking force for each wheel of the vehicle using a hydraulic pressure; a master cut valve that is a normally closed valve for opening and closing a fluid flow path between the master cylinder and the slave cylinder, for making a hydraulic pressure downstream of the master cut valve work in a valve closing direction; a pressure sensor for detecting the hydraulic pressure downstream of the master cut valve; and a piston controller for advancing the piston in the slave cylinder when the hydraulic pressure detected by the pressure sensor exceeds a predetermined value, and returning the piston at a predetermined timing.

The vehicle braking system according to one aspect of the present invention makes it possible to inhibit the occurrence of operation noise caused by the piston in the slave cylinder to reduce possibility that an occupant of the vehicle may feel uncomfortable from the operation noise.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

DETAILED DESCRIPTION OF THE EMBODIMENTS

An embodiment of the present invention will be hereinafter described in detail with reference to the accompanying drawings.

Figure 1:
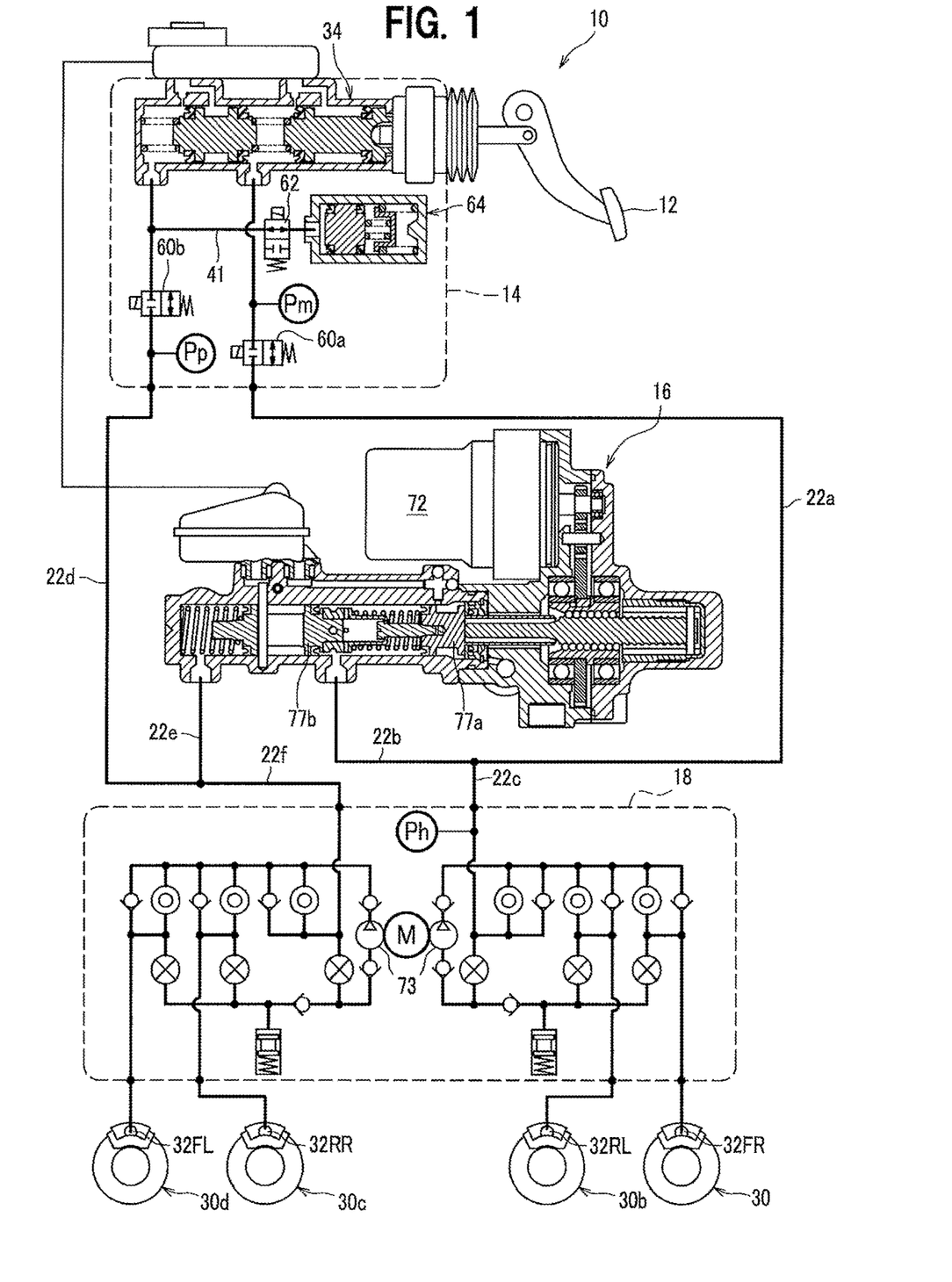
FIG. 1 is a system diagram illustrating a schematic configuration of a vehicle braking system according to an embodiment of the present invention.

FIG. 1 is a system diagram illustrating a schematic configuration of a vehicle braking system 10 according to the embodiment. The vehicle braking system 10 is an apparatus for generating a frictional braking force for a vehicle. The vehicle braking system 10 is a brake-by-wire system. The vehicle braking system 10 includes an input unit 14 including things such as a master cylinder 34 for converting a pedal effort inputted by a driver's operating a brake pedal 12 into a brake fluid hydraulic pressure (hydraulic pressure). The vehicle braking system 10 includes a slave cylinder 16 for generating a hydraulic pressure, which has nothing to do with the hydraulic pressure generated by the master cylinder 34. The vehicle braking system 10 further includes a vehicle behavior stabilizer (a vehicle stability assist) 18, disk brake mechanisms 30a to 30d, and the like. The slave cylinder 16 includes first and second slave pistons 77a, 77b (pistons) for generating a hydraulic pressure by receiving a driving force of a motor 72, which is an electric actuator.

Pipes 22a to 22f are provided with pressure sensors Pm, Pp, Ph for detecting hydraulic pressures at their respective arranged locations. The pressure sensor Pm detects the hydraulic pressure in the master cylinder 34. The pressure sensor Pp detects a hydraulic pressure downstream of first and second master cut valves 60a, 60b. The pressure sensor Ph detects the hydraulic pressure in the vehicle behavior stabilizer 18.

The vehicle behavior stabilizer 18 includes pumps 73 for pressuring the brake fluid.

Wheel cylinders 32FR, 32RL, 32RR, 32FL are connected to the slave cylinder 16. They are connected together via the vehicle behavior stabilizer 18.

With a hydraulic pressure, the wheel cylinder 32FR generates a frictional braking force in the disk brake mechanism 30a provided to a right front wheel of the vehicle (not illustrated). With a hydraulic pressure, the wheel cylinder 32RL generates a frictional braking force in the disk brake mechanism 30b provided to a left rear wheel. With a hydraulic pressure, the wheel cylinder 32RR generates a frictional braking force in the disk brake mechanism 30c provided to a right rear wheel. With a hydraulic pressure, the wheel cylinder 32FL generates a frictional braking force in the disk brake mechanism 30d provided to a left front wheel.

The vehicle behavior stabilizer 18 provides hydraulic pressures to the respective wheel cylinders 32FR, 32RL, 32RR, 32FL, and thereby provides the braking forces to the four respective wheels of the vehicle. Thus, the vehicle behavior stabilizer 18 performs various braking operations for stabilizing the behavior of the vehicle.

Next, description will be given of a basic operation of the vehicle braking system 10. While the slave cylinder 16 and the control-by-wire system are in normal operation, the vehicle braking system 10 activates the so-called brake-by-wire system once the driver presses the brake pedal 12. The driver's pressing of the brake pedal 12 is detected by a brake pedal stroke sensor 105, which will be described later. Specifically, once the driver presses the brake pedal 12, the vehicle braking system 10 in the normal operation closes the first and second master cut valves 60a, 60b. This cuts off the communication of the master cylinder 34 with the disk brake mechanisms 30a to 30d (the wheel cylinders 32FR, 32RL, 32RR, 32FL) for braking the respective wheels. Thereafter, the slave cylinder 16 operates the disk brake mechanisms 30a to 30d using the hydraulic pressure generated by the driving of the motor 72, and brakes the wheels.

In the normal operation, the first and second master cut valves 60a, 60b are shut off. Meanwhile, a shut-off valve 62 is opened, and the brake fluid flows from the master cylinder 34 to a stroke simulator 64. Thereby, the brake fluid moves although the first and second master cut valves 60a, 60b are shut off. The operation of the brake pedal 12 strokes the brake pedal 12, and generates a pedal reaction force.

On the other hand, while the slave cylinder 16 and the like are inoperative or in disorder, the vehicle braking system 10 activates the existing hydraulic braking system once the driver presses the brake pedal 12. Specifically, once the driver presses the brake pedal 12, the vehicle braking system 10 in disorder opens the first and second master cut valves 60a, 60b. Furthermore, the vehicle braking system 10 closes the shut-off valve 62, and transmits the hydraulic pressure generated by the master cylinder 34 to the disk brake mechanisms 30a to 30d (the wheel cylinders 32FR, 32RL, 32RR, 32FL). Thereby, the master cylinder 34 operates the disk brake mechanisms 30a to 30d (the wheel cylinders 32FR, 32RL, 32RR, 32FL), and brakes the wheels.

The configurations and operations of the input unit 14, the slave cylinder 16 and the vehicle behavior stabilizer 18 are publicly known, and detailed descriptions for them will be omitted.

Figure 2:
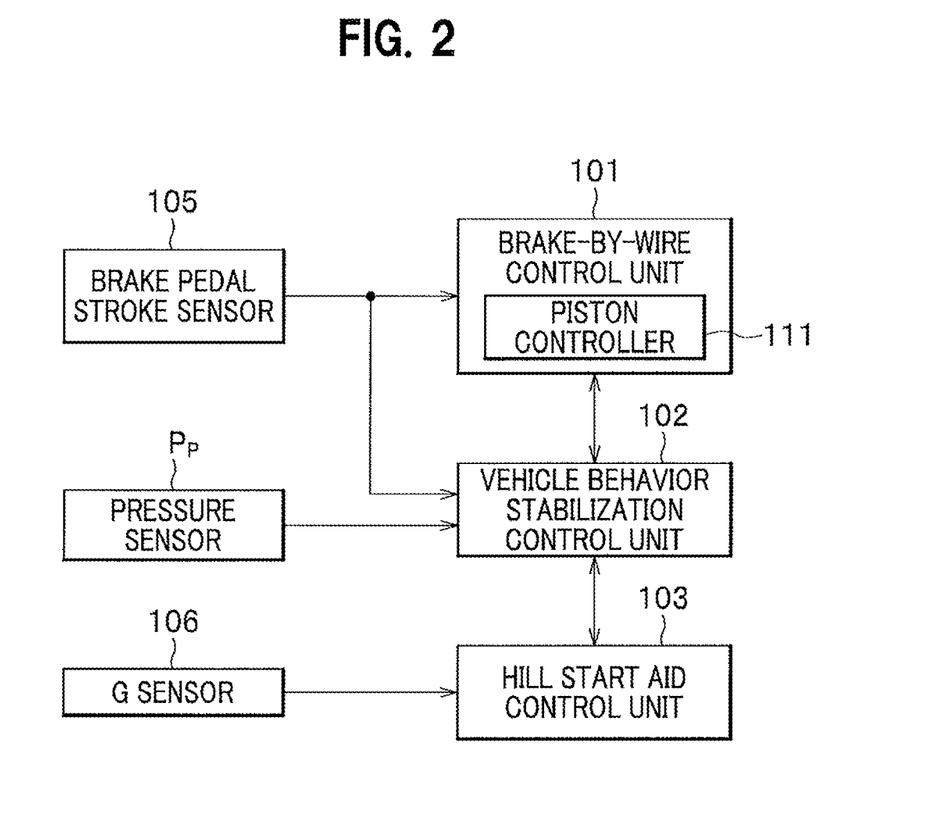
FIG. 2 is a block diagram illustrating a vehicle braking control system using the vehicle braking system according to the embodiment of the present invention.

FIG. 2 is a block diagram illustrating a vehicle braking control system using the vehicle braking system 10. In FIG. 2, a brake-by-wire control unit 101 is a control unit for performing the brake-by-wire control in the vehicle braking system 10. The brake-by-wire control unit 101 is made from a microcomputer.

A vehicle behavior stabilization control unit 102 is a control unit for controlling the vehicle behavior stabilizer 18. The vehicle behavior stabilization control unit 102 is made from a microcomputer.

A hill start aid control unit 103 is a control unit for performing control to realize a function of a hill start aid system using the vehicle behavior stabilizer 18. The hill start aid system is a system for preventing the vehicle, which is going to start on an uphill road, from moving backward by automatically causing the vehicle behavior stabilizer 18 to hold the hydraulic pressure and generate a braking force even when the driver takes the foot off the brake pedal 12. The hill start aid control unit 103 is made from a microcomputer.

The brake pedal stroke sensor 105 for detecting a stroke of the brake pedal 12 is connected to the brake-by-wire control unit 101. Thereby, the brake-by-wire control unit 101 detects whether and how much the driver is pressing the brake pedal 12. Based on the detection result and the like, the brake-by-wire control unit 101 performs the brake-by-wire control.

The pressure sensor Pp for detecting the hydraulic pressure downstream of the first and second master cut valves 60a, 60b is connected to the vehicle behavior stabilization control unit 102. In addition, the brake pedal stroke sensor 105 is connected to the vehicle behavior stabilization control unit 102.

A G sensor 106 for detecting the vehicle's tilt and its direction is connected to the hill start aid control unit 103. Thereby, the hill start aid control unit 103 controls the vehicle behavior stabilizer 18 via the vehicle behavior stabilization control unit 102, as discussed later. This realizes the function of the hill start aid system, as discussed later.

The brake-by-wire control unit 101 and the vehicle behavior stabilization control unit 102 make communications between them. Furthermore, the vehicle behavior stabilization control unit 102 and the hill start aid control unit 103 make communications between them. These communications are made via a controller area network (CAN). Incidentally, the hill start aid control unit 103 may constitute part of the vehicle behavior stabilization control unit 102.

When determining that the vehicle stops on an uphill road based on a detection signal from the G sensor 106, if detecting that the driver takes the foot off the brake pedal 12 based on a detection signal from the brake pedal stroke sensor 105, the hill start aid control unit 103 sends an instruction signal to the vehicle behavior stabilization control unit 102, and makes the vehicle behavior stabilizer 18 hold the hydraulic pressure and generate the braking force in order to prevent the vehicle from moving backward.

Returning to FIG. 1, while the function of the hill start aid system is realized, the hydraulic pressure in the vehicle behavior stabilizer 18 is held, and the brake fluid is accumulated in the vehicle behavior stabilizer 18. In this case, while the driver is pressing the brake pedal 12, the first and second master cut valves 60a, 60b normally remain closed.

If the driver takes the foot off the brake pedal 12 while the first and second master cut valves 60a, 60b are closed, the brake fluid, accumulated in the master cylinder 34 since the brake pedal 12 has been pressed, flows downstream of the first and second master cut valves 60a, 60b. This is because when the driver takes the foot off the brake pedal 12, the first and second master cut valves 60a, 60b become opened. Accordingly, the amount of brake fluid downstream of the first and second master cut valves 60a, 60b becomes excessive.

Thereafter, when the driver presses the brake pedal 12 once again, the large amount of brake fluid already stays downstream of the first and second master cut valves 60a, 60b; the first and second master cut valves 60a, 60b always remain closed; and the hydraulic pressure applied to the first and second master cut valves 60a, 60b from the downstream sides of the first and second master cut valves 60a, 60b works in a direction in which the hydraulic pressure closes the first and second master cut valves 60a, 60b. For these reasons, no matter how the driver presses the brake pedal 12, the high hydraulic pressure from the downstream side makes it impossible for the first and second master cut valves 60a, 60b to be opened by their return spring forces. In other words, a self-lock phenomenon happens to the first and second master cut valves 60a, 60b.

For the purpose of solving the above problem, the technique disclosed in Patent document 1 advances the pistons in the slave cylinder slightly in the pressuring direction while the hydraulic pressure control unit holds the hydraulic pressure. Thereafter, when the driver takes the foot off the brake pedal, or when the hill hold control is terminated, the disclosed technique withdraws and returns the pistons in the slave cylinder to their initial positions. The action of returning the pistons makes it possible for the brake fluid to be collected into the pistons to some extent. This makes it possible to inhibit the excessive rise in the hydraulic pressure downstream of the master cut valves, and accordingly to open the master cut valves.

The technique disclosed in Patent document 1, however, causes operation noise when operating the pistons in the slave cylinder in order to prevent the self-lock phenomenon of the master cut valves. Furthermore, even during their driving, vehicles of recent years stop their engines more frequently while performing an idling stop function, or an EV mode and the like in a case where they are hybrid vehicles. While the engines are stopped, the operation noise caused by the pistons working in the slave cylinder is more audible, and occupants of the vehicles are more likely to feel uncomfortable from the operation noise.

With this taken into consideration, descriptions will be hereinbelow provided for contents of the control to be performed by the vehicle braking system 10 according to the embodiment which prevents the problem.

To begin with, when detecting that the vehicle stops on an uphill road based on the detection signal from the G sensor 106, the hill start aid control unit 103 controls the vehicle behavior stabilizer 18. Thereby, the hill start aid control unit 103 raises the hydraulic pressure in the vehicle behavior stabilizer 18, and holds the high hydraulic pressure to brake the vehicle in order to prevent the vehicle from moving backward down the road. Thereby, the vehicle behavior stabilizer 18 is capable of realizing the function of the hill start aid system even if the driver takes the foot off the brake pedal 105.

Figure 3:
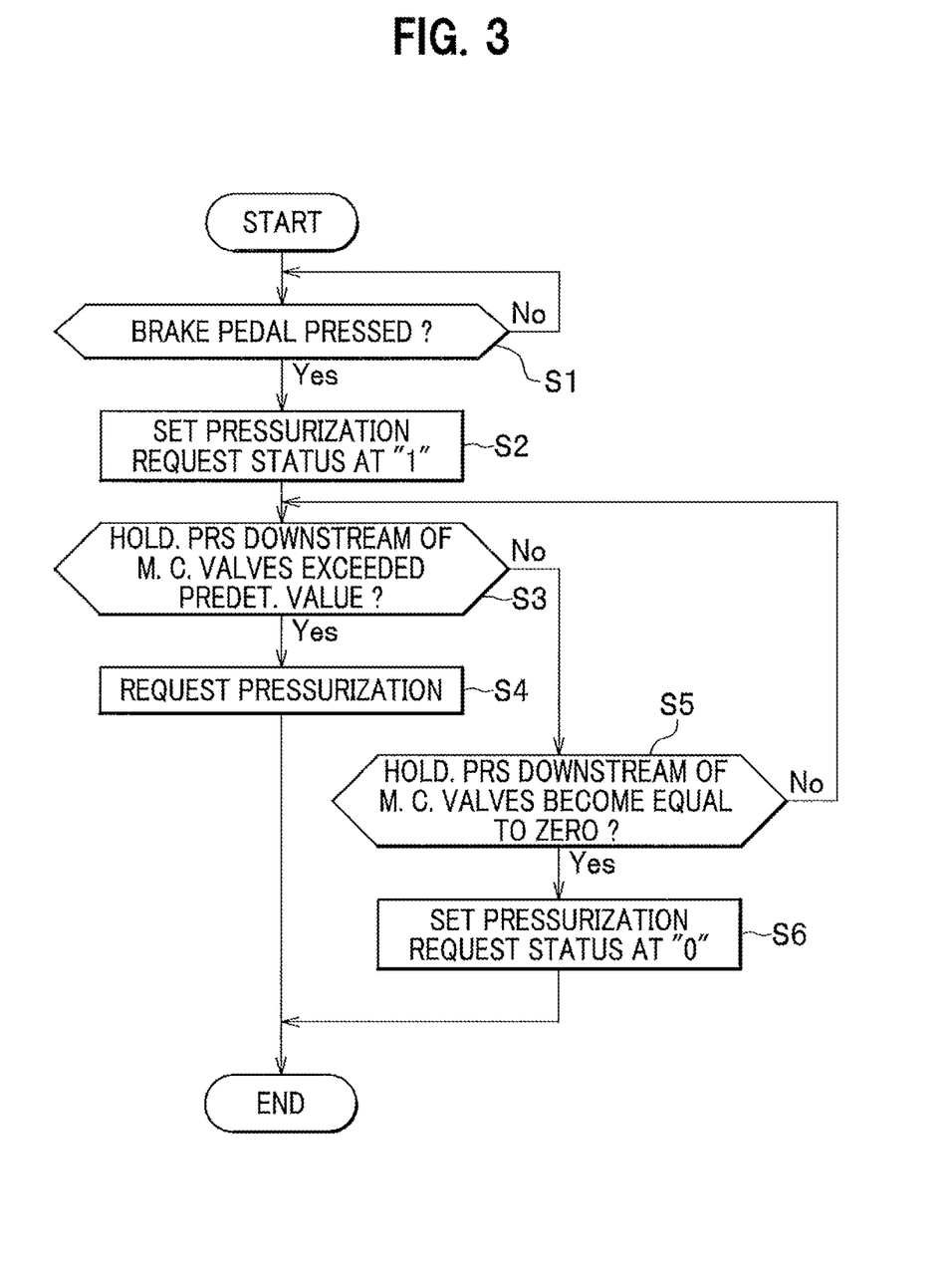
FIG. 3 is a flowchart for explaining a process to be performed by a vehicle behavior stabilization control unit in the vehicle braking system according to the embodiment of the present invention.
Figure 4:
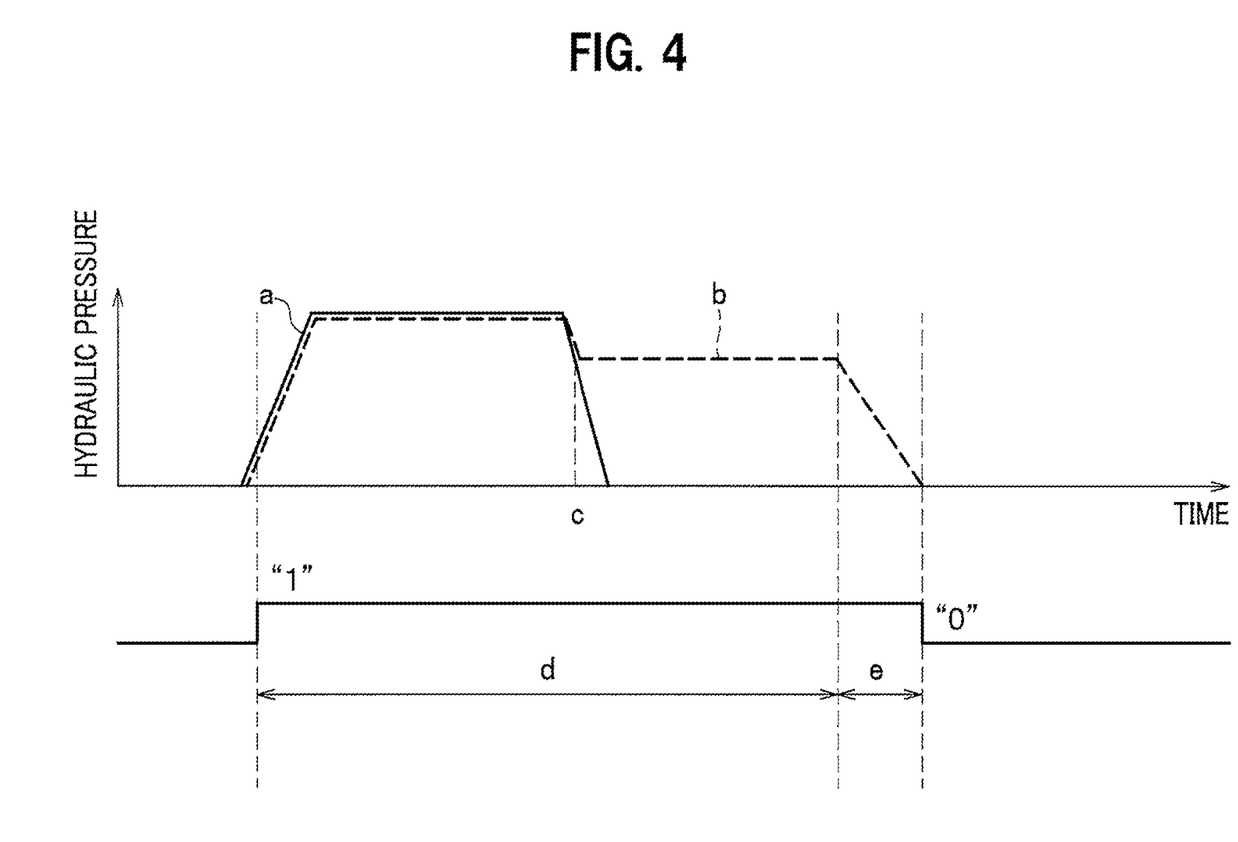
FIG. 4 is a graph for explaining the process to be performed by the vehicle behavior stabilization control unit in the vehicle braking system according to the embodiment of the present invention.
Figure 5:
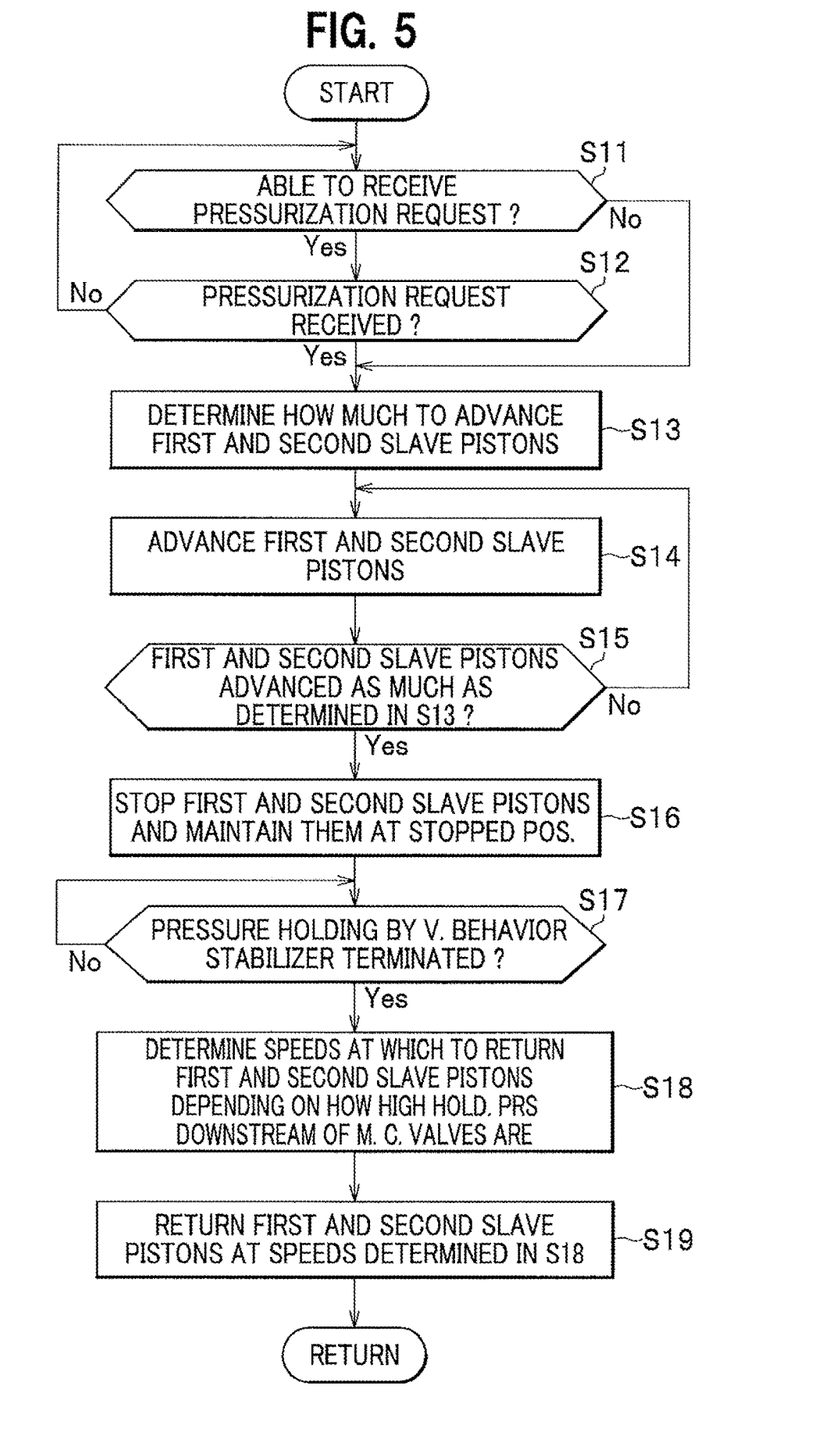
FIG. 5 is a flowchart for explaining a process to be performed by a piston controller in the vehicle braking system according to the embodiment of the present invention.

Meanwhile, the brake-by-wire control unit 101 includes a piston controller 111 as one of its functions. FIG. 3 is a flowchart for explaining a process to be performed by the vehicle behavior stabilization control unit 102. FIG. 4 is a graph for explaining the process to be performed by the vehicle behavior stabilization control unit 102, where the vertical axis represents the hydraulic pressure and the like while the horizontal axis represents elapsed time. FIG. 5 is a flowchart for explaining a process to be performed by the piston controller 111.

To begin with, once the driver presses the brake pedal 12, a master cylinder pressure a (FIG. 4) increases, and the slave cylinder 16 generates a hydraulic pressure. In addition, the vehicle behavior stabilizer 18 generates a hydraulic pressure by realizing the function of the hill start aid system. Thus, hydraulic pressures (caliper pressures b) of the respective wheel cylinders 32FR, 32RL, 32RR, 32FL become higher (FIG. 4).

As illustrated in FIG. 3, at a timing when the driver presses the brake pedal 12 (if Yes in step S1), the vehicle behavior stabilization control unit 102 raises a flag representing a pressurization request status (sets the pressurization request status at "1") (S2). Once the pressurization request status is set at "1," the following process is performed if a predetermined condition discussed later is satisfied. Specifically, if the predetermined condition is satisfied, the vehicle behavior stabilization control unit 102 sends the pressurization request to the piston controller 111 in the brake-by-wire control unit 101.

Thereafter, once the driver takes the foot off the brake pedal 12, the master cylinder pressure a falls to zero as illustrated in FIG. 4, and the slave cylinder 16 stops generating the hydraulic pressure as well. If, however, the G sensor 106 detects that the vehicle stops on an uphill road, the hill start aid control unit 103 continues requesting the vehicle behavior stabilization control unit 102 to hold the hydraulic pressure (at time c in FIG. 4). Thus, as illustrated in FIG. 4, although the master cylinder pressure a falls to zero, the caliper pressure b is held at a predetermined value after slightly falling in response to the slave cylinder 16 no longer generating the hydraulic pressure. Until this time, the pressurization request status is kept at "1" (for a period d). Subsequently, the pressurization request status is kept at "1" (for a period e), until the holding pressure of the vehicle behavior stabilizer 18 gradually decreases to zero.

Accordingly, when the driver takes the foot off the brake pedal 12, the hydraulic pressure in the vehicle behavior stabilizer 18 has already risen, and the brake fluid flows downstream of the first and second master cut valves 60a, 60b in response to the driver having pressed the brake pedal 12. When, therefore, the first and second master cut valves 60a, 60b are opened, the amount of brake fluid downstream of the first and second master cut valves 60a, 60b may have become excessive. If the amount of brake fluid has become excessive, the self-lock phenomenon is likely to happen to the first and second master cut valves 60a, 60b. Specifically, there is a high possibility that the first and second master cut valves 60a, 60b will not open again after being closed once.

Against this background, as illustrated in FIG. 3, the vehicle behavior stabilization control unit 102 compares the holding pressure downstream of the first and second master cut valves 60a, 60b, which is detected by the pressure sensor Pp, with a predetermined value (threshold) (S3). The threshold suggests that the self-lock phenomenon may happen if the holding pressure downstream of the first and second master cut valves 60a, 60b is greater than the value. If the holding pressure downstream of the first and second master cut valves 60a, 60b is greater than the predetermined value (if Yes in step S3), the vehicle behavior stabilization control unit 102 sends the pressurization request to the piston controller 111 in the brake-by-wire control unit 101 (S4). This pressurization request includes information on how high the holding pressure is. Incidentally, if the holding pressure is greater than the predetermined value (if Yes in step S3), the pressurization request further includes a prediction that the holding pressure will become higher.

If the holding pressure downstream of the first and second master cut valves 60a, 60b is not greater than the predetermined value (if No in step S3), the vehicle behavior stabilization control unit 102 determines whether the holding pressure is at zero (S5). If the holding pressure is at zero (if Yes in step S5), the vehicle behavior stabilization control unit 102 sets the pressurization request status at "0" (S6), and terminates the process. If the holding pressure in the vehicle behavior stabilizer 18 is not at zero (if No in step S5), the control to be performed by the vehicle behavior stabilization control unit 102 returns to step S3.

Referring to FIG. 5, the piston controller 111 determines whether the piston controller 111 can receive the pressurization request from the vehicle behavior stabilization control unit 102 (S11). An example of a case where the piston controller 111 cannot receive the pressurization request is a case where the communications via the CAN fails. In the case where the piston controller 111 cannot receive the pressurization request, the piston controller 111 cannot determines whether the holding pressure downstream of the first and second master cut valves 60a, 60b is greater than the predetermined value. If the piston controller 111 cannot receive the pressurization request (if No in step S11), the piston controller 111 proceeds to step S13. If the piston controller 111 can receive the pressurization request (if Yes in step S11), the piston controller 111 determines whether the piston controller 111 has received the pressurization request from the vehicle behavior stabilization control unit 102 (S12). If the piston controller 111 has received the pressurization request from the vehicle behavior stabilization control unit 102 (if Yes in step S12), the piston controller 111 proceeds to step S13. If the piston controller 111 has not received the pressurization request (if No in step S12), the piston controller 111 returns to step S11. By receiving the pressurization request, the piston controller 111 can know that the holding pressure downstream of the first and second master cut valves 60a, 60b is greater than the predetermined value. This means that the self-lock phenomenon is likely to happen to the first and second master cut valves 60a, 60b.

Against this background, the piston controller 111 performs control in order to inhibit the occurrence of the self-lock phenomenon. To begin with, in step S13, the piston controller 111 determines how much to advance the first and second slave pistons 77a, 77b in the slave cylinder 16. The determination is made such that the amount by which to advance the first and second slave pistons 77a, 77b becomes larger as the holding pressure downstream of the first and second master cut valves 60a, 60b, shown by the received pressurization request, becomes larger. If the piston controller 111 cannot receive the pressurization request (if No in step S11), the piston controller 111 determines the amount by which to advance the first and second slave pistons 77a, 77b such that the amount is equal to predetermined amount set in advance.

Next, the piston controller 111 advances the first and second slave pistons 77a, 77b up to the amount determined in step S13 (S14). Once the first and second slave pistons 77a, 77b move forward up to the amount determined in step S13 (if Yes in step S15), the piston controller 111 stops and holds the pistons at the respective positions (S16). Since like this, the first and second slave pistons 77a, 77b are advanced by the predetermined amount, the brake fluid inside the vehicle braking system 10 is pressurized. Incidentally, the action of advancing the first and second slave pistons 77a, 77b is performed even when the engine of the vehicle stops. Specifically, during the driving of the vehicle, even in the case where the engine stops while in the EV mode of a hybrid vehicle or in an idling stop function, the pistons are advanced. Similarly, the first and second slave pistons 77a, 77b is returned to their initial positions even in the case where the engine stops.

Next, if the vehicle behavior stabilizer 18 has completed holding the hydraulic pressure (if Yes in step S17), the piston controller 111 returns the advanced first and second slave pistons 77a, 77b to their initial positions. The piston controller 111 can know the completion of holding the hydraulic pressure, based on a notice from the vehicle behavior stabilization control unit 102 to the brake-by-wire control unit 101. Specifically, the completion of holding the hydraulic pressure means completing the control for making the vehicle behavior stabilizer 18 work as the hill start aid system based on the control by the hill start aid control unit 103. In the case of the completion, to begin with, the piston controller 111 determines a speed at which to return the pistons, depending on how high the holding pressure downstream of the first and second master cut valves 60a, 60b is (S18), the information on which is included in the received pressurization request (S12). Specifically, the piston controller 111 determines the speed at which to return the first and second slave pistons 77a, 77b to their initial positions such that the speed becomes lower as the holding pressure becomes higher. If the piston controller 111 cannot receive the pressurization request (if No in step S11), the piston controller 111 sets the speed at a speed set in advance. Thereafter, the piston controller 111 returns the first and second slave pistons 77a, 77b to their initial positions at the speed determined in step S18 (S19). The timing at which the pistons are returned to their initial positions is that at which the pressurization request status is reset at "0" in FIG. 4.

At this time, some of the brake fluid existing downstream of the first and second master cut valves 60a, 60b is collected into the slave cylinder 16. This makes it possible to decrease the hydraulic pressure downstream of the first and second master cut valves 60a, 60b, and accordingly to inhibit the occurrence of the self-lock phenomenon to the first and second master cut valves 60a, 60b.

The above-discussed vehicle braking system 10 according to the embodiment performs the following control if the holding pressure downstream of the first and second master cut valves 60a, 60b is greater than the predetermined value (S3 and S12). Specifically, the vehicle braking system 10 advances the first and second slave pistons 77a, 77b by the predetermined amount (S14), and thereafter returns the pistons to their initial positions (S19). The predetermined value is a value suggesting that if the holding pressure downstream of the first and second master cut valves 60a, 60b becomes greater than the value, the self-lock phenomenon may occur. As the pistons are returned, a predetermined amount of brake fluid is absorbed into the slave cylinder 16. This makes it possible to reduce the hydraulic pressure downstream of the first and second master cut valves 60a, 60b, and accordingly to inhibit the occurrence of the self-lock phenomenon to the first and second master cut valves 60a, 60b.

The embodiment advances the first and second slave pistons 77a, 77b only when the self-lock phenomenon is likely to occur, even when making the vehicle behavior stabilizer 18 function as the hill start aid system. This makes it possible to reduce the number of times the first and second slave pistons 77a, 77b are operated, and thus to reduce the number of times the slave cylinder 16 is operated and causes the operation noise. In other words, the occurrence of the operation noise can be inhibited. Accordingly, it is possible to reduce the uncomfortableness coming from the operation noise caused by the slave cylinder 16, and felt by the occupant of the vehicle.

In addition, to this end, the amount by which to advance the first and second slave pistons 77a, 77b in the slave cylinder 16 is determined in advance (S13). The determination is made such that the amount by which to advance the first and second slave pistons 77a, 77b becomes larger as the holding pressure downstream of the first and second master cut valves 60a, 60b, shown by the received pressurization request, becomes larger. Accordingly, as the hydraulic pressure downstream of the first and second master cut valves 60a, 60b becomes larger, the amount of brake fluid to be taken into the slave cylinder 16 can become larger. Even though, therefore, the hydraulic pressure downstream of the first and second master cut valves 60a, 60b is high, the self-lock phenomenon can be inhibited effectively.

Furthermore, the speed at which to return the first and second slave pistons 77a, 77b is determined depending on how high the holding pressure downstream of the first and second master cut valves 60a, 60b is (S18). Specifically, the determination is made such that the speed at which to return the first and second slave pistons 77a, 77b becomes lower as the holding pressure downstream of the first and second master cut valves 60a, 60b become higher. It is therefore possible to inhibit a situation in which when the holding pressure downstream of the first and second master cut valves 60a, 60b is high, a negative pressure in the slave cylinder 16 sucks the brake fluid into the slave cylinder 16.

Moreover, the controls in FIGS. 4 and 5 are performed even when the engine of the vehicle stops. Specifically, the vehicle braking system decreases the number of times the slave cylinder 16 is operated and causes the operation noise, even in the situation where the vehicle compartment is quiet since even during its driving, the vehicle stops the engine while performing the EV mode of a hybrid vehicle or the idling stop function. In other words, the vehicle braking system can reduce the uncomfortableness felt by the occupant of the vehicle even in the situation where the operation noise of the slave cylinder 16 is most jarring, by decreasing the number of times the slave cylinder 16 is operated and causes the operation noise (or by inhibiting the occurrence of the operation noise).

Furthermore, even if the brake-by-wire control unit 101 cannot receive the pressurization request due to things such as communication failure in the CAN in the vehicle (if No in step S11), the brake-by-wire control unit 101 advances the first and second slave pistons 77a, 77b (S13). In other words, even in the case where it is unclear whether the holding pressure in the vehicle behavior stabilizer 18 is greater than the predetermined value, the brake-by-wire control unit 101 advances the first and second slave pistons 77a, 77b. This makes it possible to securely prevent the self-lock phenomenon.

It should be noted that the processes in FIGS. 3 and 5 are not limited to being performed to make the vehicle behavior stabilizer 18 function as the hill start aid system. The processes in FIGS. 3 and 5 can be performed to control the behavior of the vehicle not only on the uphill road, but also in a situation where the holding pressure in the vehicle behavior stabilizer 18 becomes high.

Although the embodiment of the present invention has been described and illustrated in detail, the disclosed embodiment is made for purposes of illustration and example only and not limitation. The scope of the present invention should be interpreted by terms of the appended claims.

What is claimed is:

1. A vehicle braking system comprising:
   a master cylinder configured to generate a hydraulic pressure in response to a pedal effort of a driver;
   a slave cylinder configured to generate a braking force for a vehicle using a hydraulic pressure by driving a piston that is operated with an electric actuator, the slave cylinder being connected with the master cylinder;
   a vehicle behavior stabilizer configured to generate a braking force for each wheel of the vehicle using a hydraulic pressure, the vehicle behavior stabilizer being connected with the slave cylinder;
   a master cut valve including a normally closed valve for opening and closing a fluid flow path between the master cylinder and the slave cylinder, a hydraulic pressure downstream of the master cut valve working in a valve closing direction;
   a pressure sensor configured to detect the hydraulic pressure downstream of the master cut valve; and
   a piston controller configured, in response to the hydraulic pressure detected by the pressure sensor exceeding a predetermined value, to advance the piston in the slave cylinder to pressurize fluid downstream of the master cut valve and then, at a predetermined timing, return the piston.

2. The vehicle braking system according to claim 1, wherein the piston controller is further configured to change, in accordance with the hydraulic pressure detected by the pressure sensor, an amount by which to advance the piston in response to the hydraulic pressure exceeding the predetermined value.

3. The vehicle braking system according to claim 1, wherein the piston controller is further configured to lower a return speed at which to return the piston as the hydraulic pressure detected by the pressure sensor becomes higher.

4. The vehicle braking system according to claim 2, wherein the piston controller is further configured to lower a return speed at which to return the piston as the hydraulic pressure detected by the pressure sensor becomes higher.

5. The vehicle braking system according to claim 1, wherein the piston controller is further configured to advance the piston even when an engine of the vehicle stops.

6. The vehicle braking system according to claim 2, wherein the piston controller is further configured to advance the piston even when an engine of the vehicle stops.

7. The vehicle braking system according to claim 3, wherein the piston controller is further configured to advance the piston even when an engine of the vehicle stops.

8. The vehicle braking system according to claim 4, wherein the piston controller is further configured to advance the piston even when an engine of the vehicle stops.

9. The vehicle braking system according to claim 1, wherein the piston controller is further configured to advance the piston by a predetermined amount even when the hydraulic pressure detected by the pressure sensor becomes unclear before advancing the piston.

\* \* \* \* \*